United States Patent [19]
Ceshkovsky

[11] Patent Number: 5,978,331
[45] Date of Patent: Nov. 2, 1999

[54] APPARATUS AND METHOD FOR FOCUS CONTROL

[75] Inventor: Ludwig Ceshkovsky, Fountain Valley, Calif.

[73] Assignee: Discovision Associates, Irvine, Calif.

[21] Appl. No.: 08/882,530

[22] Filed: Jun. 25, 1997

Related U.S. Application Data

[63] Continuation of application No. 08/569,420, Dec. 6, 1995, abandoned.

[51] Int. Cl.$^6$ ........................................ G11B 7/09
[52] U.S. Cl. ........................ 369/44.29; 369/44.35
[58] Field of Search ................... 369/44.26, 44.29, 369/44.35, 44.36, 58, 44.13, 54, 44.41, 44.32, 94; 250/201.5

[56] References Cited

U.S. PATENT DOCUMENTS

| Re. 32,051 | 12/1985 | Ceshkovsky | 369/44 |
|---|---|---|---|
| Re. 32,431 | 6/1987 | Dakin et al. | 358/338 |
| Re. 32,574 | 1/1988 | Ceshkovsky et al. | 369/32 |
| Re. 32,709 | 7/1988 | Ceshkovsky et al. | 178/6.6 R |
| 3,530,258 | 9/1970 | Gregg et al. | 179/100.3 |
| 3,633,038 | 1/1972 | Falk | 250/231 R |
| 3,794,410 | 2/1974 | Elliott | 350/285 |
| 3,829,623 | 8/1974 | Elliott | 179/100.3 V |
| 3,908,076 | 9/1975 | Broadbent | 178/6.7 A |
| 3,908,080 | 9/1975 | Broadbent | 178/6.6 R |
| 3,914,541 | 10/1975 | Elliott | 178/6.6 R |
| 3,924,062 | 12/1975 | Broadbent | 178/6.6 R |
| 3,932,700 | 1/1976 | Snopko | 178/6.6 R |
| 3,944,727 | 3/1976 | Elliott | 178/6.6 R |
| 3,997,715 | 12/1976 | Elliott | 178/6.6 DD |
| 4,118,735 | 10/1978 | Wilkinson | 358/128 |
| 4,152,586 | 5/1979 | Elliott et al. | 256/201.5 |
| 4,161,752 | 7/1979 | Basilico | 358/128 |
| 4,161,753 | 7/1979 | Bailey et al. | 358/128 |
| 4,190,860 | 2/1980 | Somers et al. | 358/128.5 |
| 4,225,873 | 9/1980 | Winslow | 346/76 L |

(List continued on next page.)

FOREIGN PATENT DOCUMENTS

| 0227445 | 7/1987 | European Pat. Off. . | |
|---|---|---|---|
| 0307130 | 3/1989 | European Pat. Off. . | |
| 0459420 | 12/1991 | European Pat. Off. . | |
| 0462561 | 12/1991 | European Pat. Off. . | |
| 0521619 | 1/1993 | European Pat. Off. . | |
| 0586084 | 3/1994 | European Pat. Off. . | |
| 58-056256 | 4/1983 | Japan . | |
| 59-068829 | 4/1984 | Japan . | |
| 59-185071 | 10/1984 | Japan . | |
| 61-80530 | 4/1986 | Japan | 369/44.29 |
| 1687656 | 7/1991 | Japan . | |
| 07182668 | 7/1995 | Japan . | |
| 2150385 | 6/1985 | United Kingdom . | |
| 9106949 | 5/1991 | WIPO . | |

OTHER PUBLICATIONS

Elliman, DG & PJ Connor, "Orientation and Scale Invariant Symbol Recognition Using a Hidden Markov Model," University of Nottingham, United Kingdom, 1993(?) pp. 331–334.

Dean, Mark E., David L. Dill & Mark Horowitz, "Self–Timed Logic Using Current–Sensing Completion Detection (CSCD)," Computer Systems Laboratory, Stanford University, CA, IEEE, 1991, pp. 187–191.

(List continued on next page.)

*Primary Examiner*—Thang V. Tran
*Attorney, Agent, or Firm*—Keiji Masaki; Donald Bollella; Clay E. Gaetje

[57] ABSTRACT

Control apparatus and method are disclosed for shifting focus on a multilayered optical medium using closed loop servo operation. The outputs of an astigmatic optical pickup are independently modified by a control signal generator according to a predetermined time varying pattern to produce a deceptive error signal that changes the apparent focal offset seen by a servo circuit. While in closed loop mode, the servo tracks the shifting apparent focal plane from a first information layer of the medium toward a second information layer. Thereafter the control signals are removed, and the servo locks focus on the second information region.

15 Claims, 6 Drawing Sheets

U.S. PATENT DOCUMENTS

| | | | |
|---|---|---|---|
| 4,228,326 | 10/1980 | Dakin et al. | 179/100.1 |
| 4,232,201 | 11/1980 | Canino | 179/100.1 |
| 4,232,337 | 11/1980 | Winslow et al. | 358/128.5 |
| 4,234,837 | 11/1980 | Winslow | 318/577 |
| 4,236,105 | 11/1980 | Wilkinson | 318/577 |
| 4,239,942 | 12/1980 | Van Alem et al. | 179/100.1 G |
| 4,252,327 | 2/1981 | Elliott et al. | 364/213 |
| 4,271,334 | 6/1981 | Yardy | 369/41 |
| 4,282,598 | 8/1981 | Elliott | 369/44 |
| 4,310,919 | 1/1982 | Slaten | 369/275 |
| 4,322,837 | 3/1982 | Mickelson et al. | 369/44 |
| 4,337,534 | 6/1982 | Basilico et al. | 369/111 |
| 4,337,538 | 6/1982 | Wilkinson et al. | 369/223 |
| 4,340,955 | 7/1982 | Elliott | 369/213 |
| 4,347,599 | 8/1982 | Vitale | 369/270 |
| 4,353,090 | 10/1982 | Broadbent | 358/342 |
| 4,357,533 | 11/1982 | Winslow | 250/204 |
| 4,358,774 | 11/1982 | Wilkinson | 346/1.1 |
| 4,358,796 | 11/1982 | Ceshkovsky et al. | 358/322 |
| 4,358,802 | 11/1982 | Jarsen | 360/99 |
| 4,367,545 | 1/1983 | Elliott | 369/213 |
| 4,370,679 | 1/1983 | Ceshkovsky et al. | 358/318 |
| 4,371,899 | 2/1983 | Ceshkovsky et al. | 358/315 |
| 4,374,323 | 2/1983 | Winslow et al. | 250/201 |
| 4,375,091 | 2/1983 | Dakin et al. | 369/32 |
| 4,397,805 | 8/1983 | Holmes | 264/328.14 |
| 4,406,000 | 9/1983 | Shoji et al. | 369/44 |
| 4,412,743 | 11/1983 | Eberly | 356/237 |
| 4,414,655 | 11/1983 | Shoji et al. | 369/44 |
| 4,439,848 | 3/1984 | Ceshkovsky et al. | 369/45 |
| 4,445,144 | 4/1984 | Giddings | 358/342 |
| 4,445,209 | 4/1984 | Mickelson et al. | 369/45 |
| 4,450,488 | 5/1984 | Golding | 358/342 |
| 4,451,913 | 5/1984 | Elliott | 369/110 |
| 4,456,914 | 6/1984 | Winslow | 346/76 L |
| 4,463,389 | 7/1984 | Golding | 358/343 |
| 4,465,977 | 8/1984 | Lopez de Romana | 328/120 |
| 4,467,467 | 8/1984 | Wilkinson et al. | 369/111 |
| 4,477,890 | 10/1984 | Mooney et al. | 369/53 |
| 4,481,613 | 11/1984 | Yokota | 369/56 |
| 4,482,989 | 11/1984 | Bierhoff | 369/46 |
| 4,488,279 | 12/1984 | Wilkinson et al. | 369/54 |
| 4,492,992 | 1/1985 | Rooney et al. | 360/73 |
| 4,499,569 | 2/1985 | Lopez De Romana | 369/45 |
| 4,504,939 | 3/1985 | Eberly | 369/46 |
| 4,514,771 | 4/1985 | Stark et al. | 360/73 |
| 4,516,177 | 5/1985 | Moon et al. | 360/77 |
| 4,519,004 | 5/1985 | Wilkinson et al. | 358/342 |
| 4,530,018 | 7/1985 | Hoshino et al. | 360/73 |
| 4,530,083 | 7/1985 | Ishihara | 369/267 |
| 4,536,863 | 8/1985 | Giddings | 369/43 |
| 4,546,460 | 10/1985 | Ando | 369/44.55 X |
| 4,566,090 | 1/1986 | Eberly | 369/46 |
| 4,571,712 | 2/1986 | Romano et al. | 369/44 |
| 4,571,716 | 2/1986 | Szerlip | 369/54 |
| 4,574,369 | 3/1986 | Koide et al. | 369/44.32 |
| 4,583,131 | 4/1986 | Dakin | 358/342 |
| 4,583,210 | 4/1986 | Winslow | 369/54 |
| 4,589,103 | 5/1986 | Tajima | 369/46 |
| 4,590,527 | 5/1986 | Warner | 360/78 |
| 4,607,157 | 8/1986 | Millar et al. | 250/201 |
| 4,607,956 | 8/1986 | Ishihara et al. | 356/375 |
| 4,611,318 | 9/1986 | Winslow | 369/54 |
| 4,638,377 | 1/1987 | Dakin | 358/343 |
| 4,648,084 | 3/1987 | Eberly | 369/46 |
| 4,651,314 | 3/1987 | Yoshikawa et al. | 369/45 |
| 4,661,944 | 4/1987 | Van Sluys | 369/44.32 |
| 4,700,334 | 10/1987 | Shinkai | 369/44 |
| 4,701,898 | 10/1987 | Giddings | 369/32 |
| 4,703,368 | 10/1987 | Dakin | 358/342 |
| 4,703,467 | 10/1987 | Elliott | 369/44 |
| 4,706,133 | 11/1987 | Giddings | 358/342 |
| 4,727,433 | 2/1988 | Dakin | 358/343 |
| 4,727,532 | 2/1988 | Giddings | 369/43 |
| 4,751,692 | 6/1988 | Giddings | 369/32 |
| 4,757,393 | 7/1988 | Dakin et al. | 358/342 |
| 4,759,007 | 7/1988 | Eberly | 369/58 |
| 4,774,699 | 9/1988 | Giddings | 369/32 |
| 4,779,251 | 10/1988 | Burroughs | 357/342 |
| 4,791,289 | 12/1988 | Watanabe et al. | 250/237 G |
| 4,796,098 | 1/1989 | Giddings | 358/342 |
| 4,797,866 | 1/1989 | Yoshikawa | 369/43 |
| 4,809,247 | 2/1989 | Elliott | 369/44 |
| 4,845,697 | 7/1989 | Giddings | 369/32 |
| 4,853,918 | 8/1989 | Kobayashi et al. | 369/44 |
| 4,855,978 | 8/1989 | Kanamaru | 369/32 |
| 4,866,695 | 9/1989 | Suzuki et al. | 369/266 |
| 4,893,297 | 1/1990 | Gregg | 369/275 |
| 4,924,455 | 5/1990 | Fujiie et al. | 369/44.21 |
| 4,939,712 | 7/1990 | Abe et al. | 369/32 |
| 4,950,890 | 8/1990 | Gelbart | 250/237 G |
| 4,980,876 | 12/1990 | Abate et al. | 365/44.11 |
| 4,980,878 | 12/1990 | Szerlip | 369/54 |
| 5,012,363 | 4/1991 | Mine et al. | 360/77.05 |
| 5,018,020 | 5/1991 | Dakin | 358/310 |
| 5,036,506 | 7/1991 | Bierhoff | 369/44.28 |
| 5,079,756 | 1/1992 | Kuwabara | 369/44.28 |
| 5,086,419 | 2/1992 | Yanagi | 369/32 |
| 5,087,973 | 2/1992 | Citta et al. | |
| 5,124,964 | 6/1992 | Hayashi | 369/44.11 |
| 5,138,592 | 8/1992 | Fujita | 369/44.13 |
| 5,138,594 | 8/1992 | Fennema | 369/44.29 |
| 5,146,442 | 9/1992 | Shikichi | 369/44.29 |
| 5,166,915 | 11/1992 | Fuldner et al. | 369/44.28 |
| 5,168,356 | 12/1992 | Acampora et al. | 358/133 |
| 5,168,486 | 12/1992 | Yanagawa | 369/44.14 |
| 5,170,384 | 12/1992 | Edahiro et al. | 369/44.28 |
| 5,170,386 | 12/1992 | Tateishi | 369/50 |
| 5,177,725 | 1/1993 | Terashi | 369/44.29 |
| 5,179,485 | 1/1993 | Tamayama | 360/106 |
| 5,189,293 | 2/1993 | Leenknegt | 250/201.5 |
| 5,210,726 | 5/1993 | Jackson et al. | 369/32 |
| 5,216,647 | 6/1993 | Kitani | 369/44.28 |
| 5,218,588 | 6/1993 | Suzuki | 369/44.27 |
| 5,247,501 | 9/1993 | Hashimoto et al. | 369/44.11 |
| 5,251,194 | 10/1993 | Yoshimoto | 369/44.29 X |
| 5,255,253 | 10/1993 | Kagami et al. | 369/44.28 |
| 5,257,251 | 10/1993 | Chow et al. | 369/44.25 |
| 5,267,226 | 11/1993 | Matsuoka et al. | 369/44.11 |
| 5,270,886 | 12/1993 | Nigam | 360/78.05 |
| 5,294,894 | 3/1994 | Gebara | 331/1 A |
| 5,304,953 | 4/1994 | Heim et al. | 331/1 A |
| 5,315,372 | 5/1994 | Tsai | 356/358 |
| 5,315,571 | 5/1994 | Maeda et al. | 369/50 |
| 5,319,622 | 6/1994 | Martin | 369/44.14 |
| 5,327,407 | 7/1994 | Suzuki et al. | 369/44.25 |
| 5,379,282 | 1/1995 | Wachi | 369/44.35 |
| 5,394,385 | 2/1995 | Sakurada et al. | 369/44.23 |
| 5,396,477 | 3/1995 | Matsumoto et al. | 369/44.28 |
| 5,459,309 | 10/1995 | Kagami et al. | 250/201.5 |
| 5,568,461 | 10/1996 | Nishiuchi | 369/44.26 X |

OTHER PUBLICATIONS

Wong, Bennett C. & Henry Samueli, "A 200–MHz All–Digital QAM Modulator and Demodulator in 1.2–m CMOS for Digital Radio Applications," IEEE Journal of Solid–State Circuits, vol. 26, No. 12, Dec. 1991, pp. 1971–1983.

Samueli, Henry, Charles P. Reames, Leo Mritreuil & William E. Wall, "Performance Results of a 64/256–QAM CATV Receiver Chip Set," Broadcom Corp., Los Angles, CA & Scientific–Atlanta Inc., Norcross, GA.

Patent Abstract for Japanese Patent JP 59068829, Apr. 18, 1984.

APPARATUS AND METHOD FOR FOCUS CONTROL

This application is a continuation, of application No. 08/569,420 filed Dec. 6, 1995, now abandoned.

BACKGROUND OF THE INVENTION

1. Field of the Invention

This invention relates to the control of a beam of energy. More particularly this invention relates to the controlled motion of a focal point of a beam of light to selected positions in a multilayered optical information medium.

2. Description of the Related Art

Digital optical media such as optical discs and optical tapes are now commonly used for mass storage of information, for example compressed MPEG encoded audio and video signals. The information storage capacity of the discs and tapes can be enhanced by layering a plurality of information containing layers on a substrate. To read a multilayered optical medium, a focal point of light is selectively positioned on the layers, and is shifted from layer to layer in accordance with the format in which the media has been written. Shifting of the focal point is generally accomplished by arrangements requiring mechanical movement of the optics relative to the medium. This requires a large separation between layers to assure differentiation of the individual layers by an optomechanical link and its associated servo circuitry.

Focus acquisition is conventionally accomplished by various servo arrangements initially operating in an open loop mode. The feedback loop of the focus servo includes a switch that is initially open, during which time the focus servo is driven by an oscillating waveform, such as a sawtooth waveform, causing an objective lens to be displaced toward and away from the optical medium, and a beam of light passing through the objective lens goes in and out of focus on the medium. At some point, when the beam is near a desired focal position, the sawtooth waveform is removed and the switch closed, thereby closing the feedback loop. Typical is the disclosure of Wachi, U.S. Pat. No. 5,379,282, which proposes the use of detectors that detect maxima and minima of return light from the optical medium, and maxima and minima of a focus error signal. These maximum and minimum signals are processed by a servo, which drives a focus actuator. A focus servo operation then executes to lock in the light focus at a desired level.

In Millar et al., U.S. Pat. No. 4,607,157, it is proposed to intentionally defocus the light spot on an optical disk after focus acquisition has been achieved and while the servo is operating in closed loop mode. The resulting variation in the read-back signal is utilized by a synchronous detection circuit to extract magnitude and polarity information of the focus offset. This is fed back to the focus servo signal to null out the defocussing effect, and restore focus lock.

A conventional focus control circuit 10 is illustrated in FIG. 1, wherein a astigmatic optical pickup 12 comprises a matrix of four photoelectric transducers 12a–12d, arranged to detect a light beam that returns from an optical information medium through an objective lens (not shown). It will be understood herein that the objective lens is a component of a known optomechanical link 28 between the focus control circuit 10 and the optical pickup 12. Signals from paired, diagonally opposed transducers (pair 12a, 12d and pair 12b, 12c) are combined on lines 13a, 13b respectively, and amplified respectively by operational amplifiers 14a, 14b. The paired signals on lines 13a, 13b independently vary as the focal point of the objective lens transits the information layer of an optical medium, and these signals are responsive to the focus offset of the objective lens from the information layer. The outputs of the operational amplifiers 14a, 14b drive a differential amplifier 16, which outputs a focus error signal on line 32. The focus error signal on line 32 is representative of the difference between the signals on lines 13a, 13b. In closed loop operation, the focus error signal on line 32 is coupled to conventional phase and gain compensating circuitry, referred to herein as servo circuitry 18. Servo circuitry is disclosed, for example, in Ceshkovsky et al., U.S. Pat. No. 4,332,022. The focus error signal on line 32 is an input to the servo circuitry 18, and causes a modification in its behavior in accordance with the loop design. The output of servo circuitry 18 is summed with the output of focus acquire control circuitry 20 in summing circuit 22. The output of the summing circuit 22 is amplified in a drive amplifier 24, and coupled to a focus actuator, represented as actuator coil 26. The optomechanical link 28 between the actuator coil 26 and the optical pickup 12 is indicated by a dashed line.

Initially switch 30 is opened by a control means (not shown), so that the focus error signal on line 32 is disengaged from the servo circuitry 18, but remains coupled to the focus acquire control circuitry 20 via line 34. In this circumstance, the focus actuator coil 26 is driven by an oscillating waveform added on summing junction 22, and the optomechanical link 28 moves an objective lens (not shown) generally toward and away from the surface of the optical medium. The output of the optical pickup 20 varies as the focal point of the objective lens approaches an information layer of the optical medium. When the lens is approximately in focus on the information layer, the switch 30 is closed, and the servo circuitry 18 begins closed loop operation.

When a light beam is perfectly focused on an information layer of an optical medium, the light intensity on the paired photodetector elements 12a, 12d and 12b,12c of the optical pickup 12 is equal. The signals on lines 13a, 13b, and the signals developed by the operational amplifiers 14a, 14b are also equal, and the output of the differential amplifier 16 is nominally zero. As the focal point of the objective lens drifts away from the information layer, the intensity of light measured by the pairs of photodetector elements varies, so that the signals on lines 13a and 13b become unequal, and the differential amplifier 16 generates a focus error signal on line 32 that has a voltage level either greater than zero, or less than zero, depending on the direction the focal point of the objective lens has moved from the information layer.

Fundamental principles underlying the invention are also disclosed in copending application Ser. No. 08/474,424, of common assignee herewith.

A typical waveform plot of a focus error signal according to the circuit of FIG. 1 is shown as waveform 50 in FIG. 3, wherein F1 and F2 indicate the positions of two information bearing layers on a multilayered optical medium. When the focal point of the objective lens is remote from the information layer of the optical medium, for example at the left side of focus error waveform 50, the focus error signal has a baseline value. As the focal point of the objective lens approaches the first information layer F1, in a direction indicated by arrow A, the differential amplifier 16 begins to develop a positive signal, which is approximately sinusoidal, and which returns to the baseline value when the objective lens focal point actually crosses the first information layer F1 at point 52. As the objective lens continues traveling beyond the first layer, the differential amplifier 16 produces a signal which is less than the baseline value. When the objective lens is sufficiently remote from the first information layer F1, the focus error signal again returns to baseline. The above sequence is repeated as the focal point of the objective lens transits a second information layer F2, with a zero crossing occurring at point 54.

With the above noted approaches it is necessary to return to an open loop mode of operation when it is desired to shift focus from a first information layer to a second information layer, and to reclose the loop in order to lock focus on the second layer. Otherwise the servo loop would initially resist movement to the second information layer, and eventually be overcome, after which the focus would move in an uncontrolled manner.

SUMMARY OF THE INVENTION

It is a primary object of the present invention to provide an improved apparatus and method for focus control in a multilayered optical information medium that allows the control loop to remain closed while focus is shifted from layer to layer.

It is another object of the invention to provide precise, reliable control of an energy beam in an apparatus that reads or writes a multilayered information medium wherein the spacing between layers is very small.

These and other objects of the present invention are attained by an apparatus for controlling a focal point of a focused beam of light that is directed onto a multilayered optical medium. The apparatus has an optical pickup which has a plurality of outputs and is responsive to light returning from the medium. A control signal generator generates first and second control signals. A first multiplier multiplies a first output of the optical pickup and the first control signal, and a second multiplier multiplies a second output of the optical pickup and the second control signal. The multipliers provide input to a difference amplifier which produces a focus error signal. A servo responsive to the focus error signal controls an actuator driver for effecting movement of the focal point toward and away from the medium.

Preferably the first and second control signals comprise smoothly continuous waveforms offset from one another by a predetermined phase angle, optimally 90 degrees. Most preferably the smoothly continuous waveforms are substantially sinusoidal.

In one aspect of the invention the control signal generator, the first multiplier, the second multiplier, the circuit, and the focus error servo are realized in a digital signal processor.

The invention provides a method of controlling a beam of radiant energy that is directed onto a medium having a plurality of information regions. The medium has a characteristic that varies according to an offset from the information regions. A beam of radiant energy is directed onto the medium and interacts with the medium. Energy resulting from the interaction between the medium and the beam is sensed, and the sensed energy is representative of the characteristic. First and second signals responsive to the sensed energy are generated, preferably in quadrature, and are modified in a predetermined manner. A servo is coupled to the modified first signal and to the modified second signal, wherein the servo operates in closed loop mode. The servo is linked to a beam adjusting means, with which it cooperates to vary an optimization of the beam with respect to a first information region of the medium toward an optimization thereof with respect to a second information region of the medium.

In one aspect of the invention the first signal is generated independently of the second signal.

In another aspect of the invention the first and second signals have smoothly continuous waveforms offset from one another by a predetermined phase angle, preferably about 90 degrees. The smoothly continuous waveforms are preferably substantially sinusoidal.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

Figure 1:
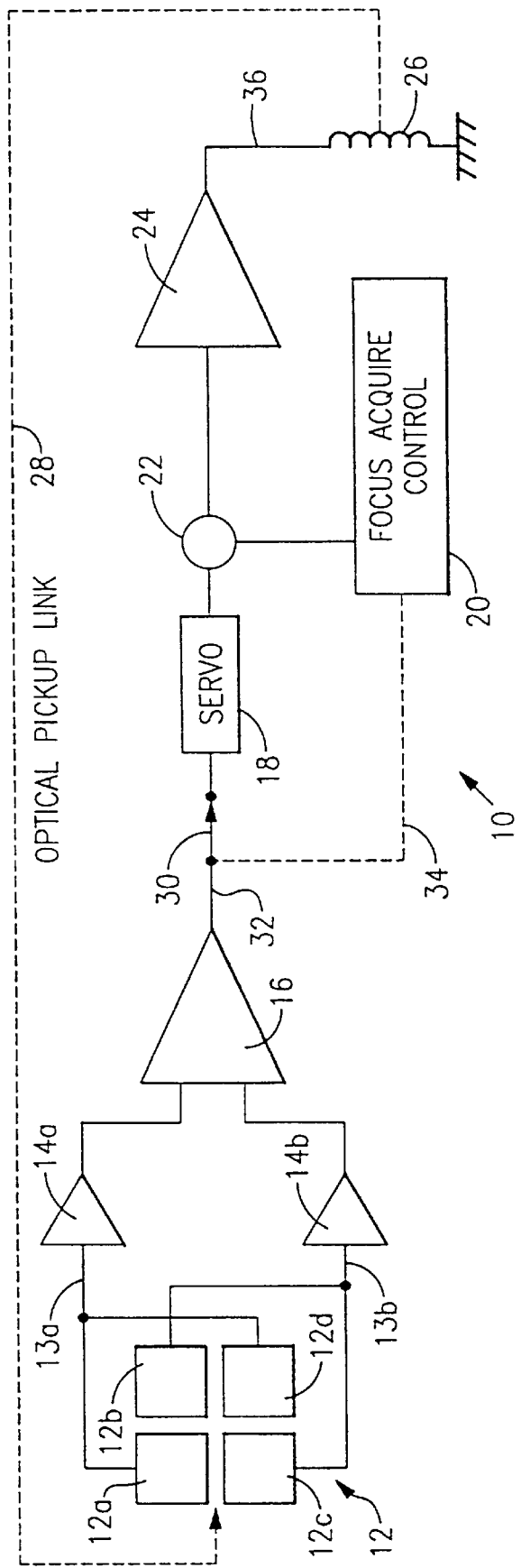
FIG. 1 is a partially schematic block diagram of a focus control circuit in accordance with the prior art.
Figure 2:
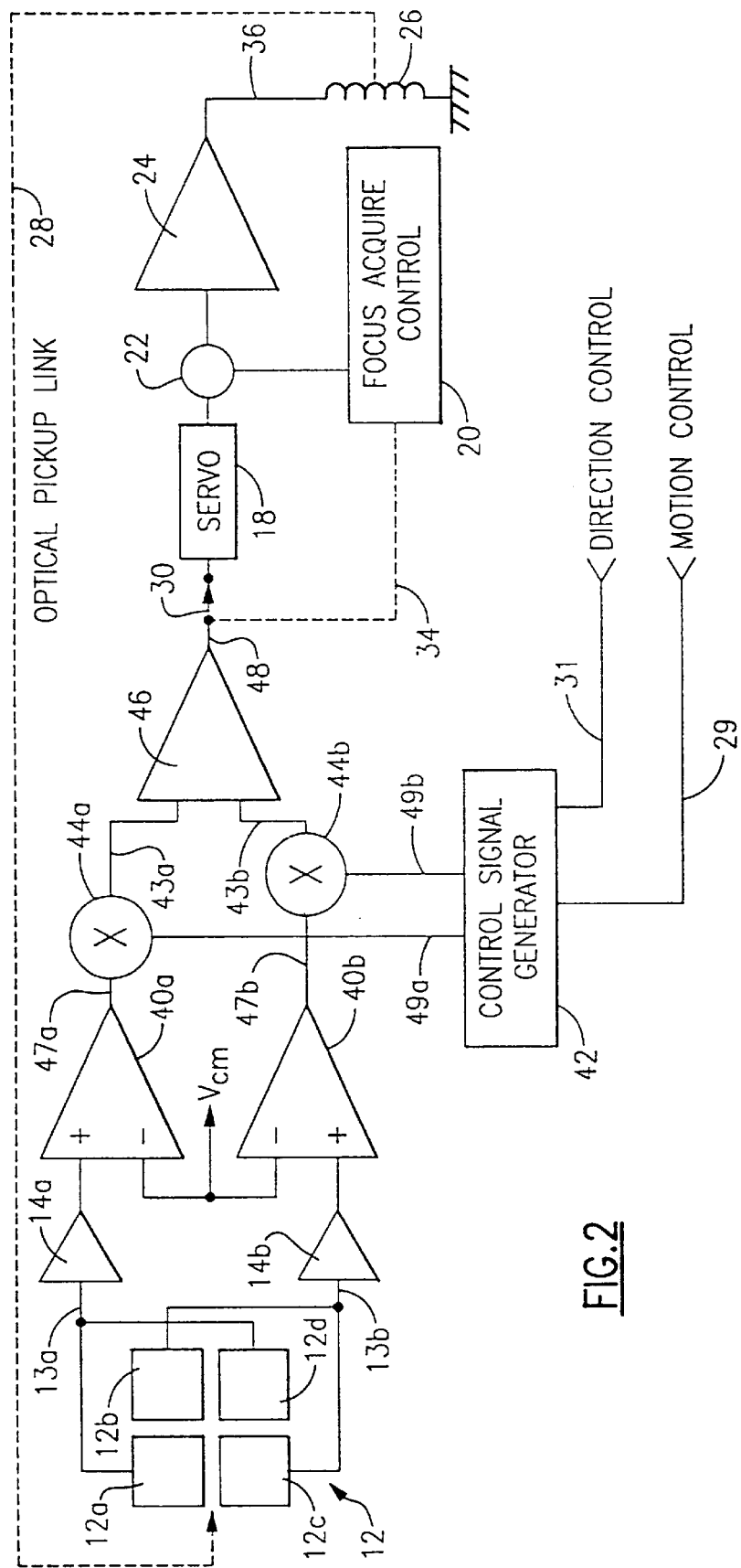
FIG. 2 is a partially schematic block diagram of a focus control circuit in accordance with a preferred embodiment of the invention.

Turning now to FIG. 2, there is shown a focus control circuit in accordance with a preferred embodiment of the invention, wherein parts identical with those of FIG. 1 are given like reference numerals. The arrangement of optical pickup 12, and operational amplifiers 14a, 14b are the same as previously described, except now the outputs of the operational amplifiers 14a, 14b are each coupled to the inverting input of operational amplifiers 40a and 40b respectively. The noninverting inputs of the operational amplifiers 40a and 40b are connected to a voltage $V_{CM}$. $V_{CM}$ can be a fixed reference voltage or can be derived from a characteristic of the optical medium. The output signals on lines 47a, 47b of the operational amplifiers 40a, 40b (representing focus error components of the output of the optical pickup 12) are respectively connected to multiplier circuits 44a, 44b, which are preferably analog multipliers. The multiplier circuits 44a, 44b are also respectively coupled to the control signals on lines 49a, 49b of a control signal generator 42. The multiplier circuits 44a, 44b drive another differential amplifier 46, which outputs a focus error signal on line 48. The focus error signal on line 48 represents the difference between the outputs on lines 43a, 43b of the multiplier circuits 44a, 44b, and propagates through switch 30 to servo circuitry 18. The switch 30, servo circuitry 18, focus acquire control circuitry 20, summing circuit 22, drive amplifier 24, actuator coil 26, and the optomechanical link between the operation of the focus actuator and the operation of the optical pickup 12 indicated by the dashed line 28 are identical with the arrangement described with reference to FIG. 1.

In operation, when the focus error signal on line 48 is not at baseline, a focus offset is interpreted as being present. The servo circuitry 18 responds to this circumstance by varying the current flowing through the actuator coil 26 in a manner that effects a motion of the objective lens so as to null out the focus offset. The response of the optical pickup 12 changes accordingly, and the focus error signal is restored to its baseline level. This, as is well known to those skilled in the art, is a fundamental aspect of the operation of a servo control loop.

The inventor has discovered that the apparent position of the focal plane of the first information layer, as evaluated by the servo circuitry 18, can be shifted continuously toward the second information layer, and that the servo circuitry 18 will accurately track the motion of a "phantom" focal plane from one actual information layer to another, while maintaining closed loop operation.

Figure 3:
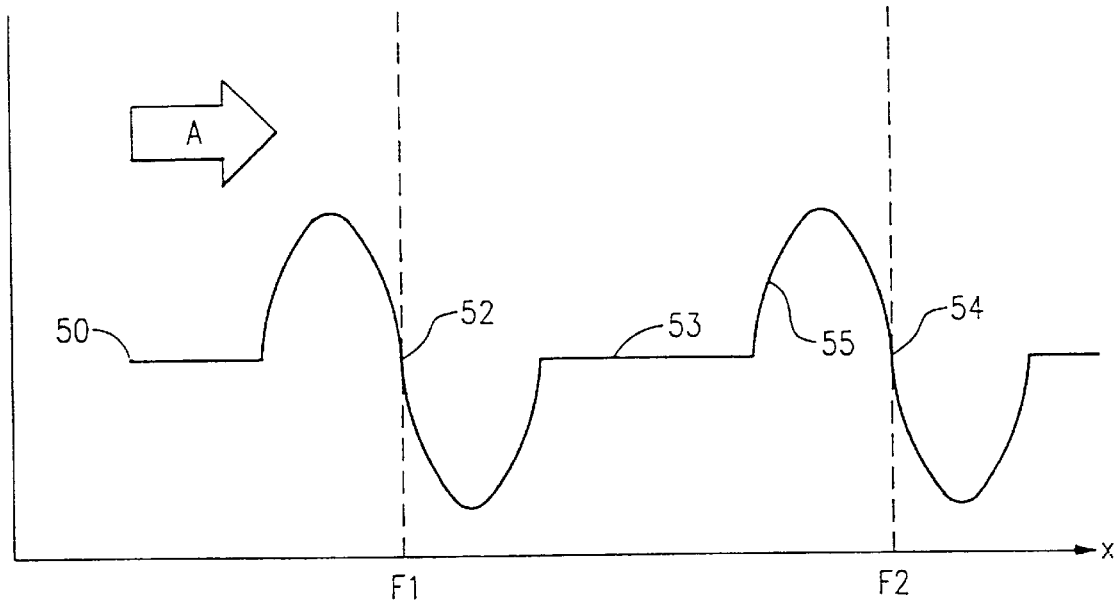
FIG. 3 is a waveform representing a focus error signal produced by a focus control circuit plotted with respect to the position of the focal point.
Figure 4:
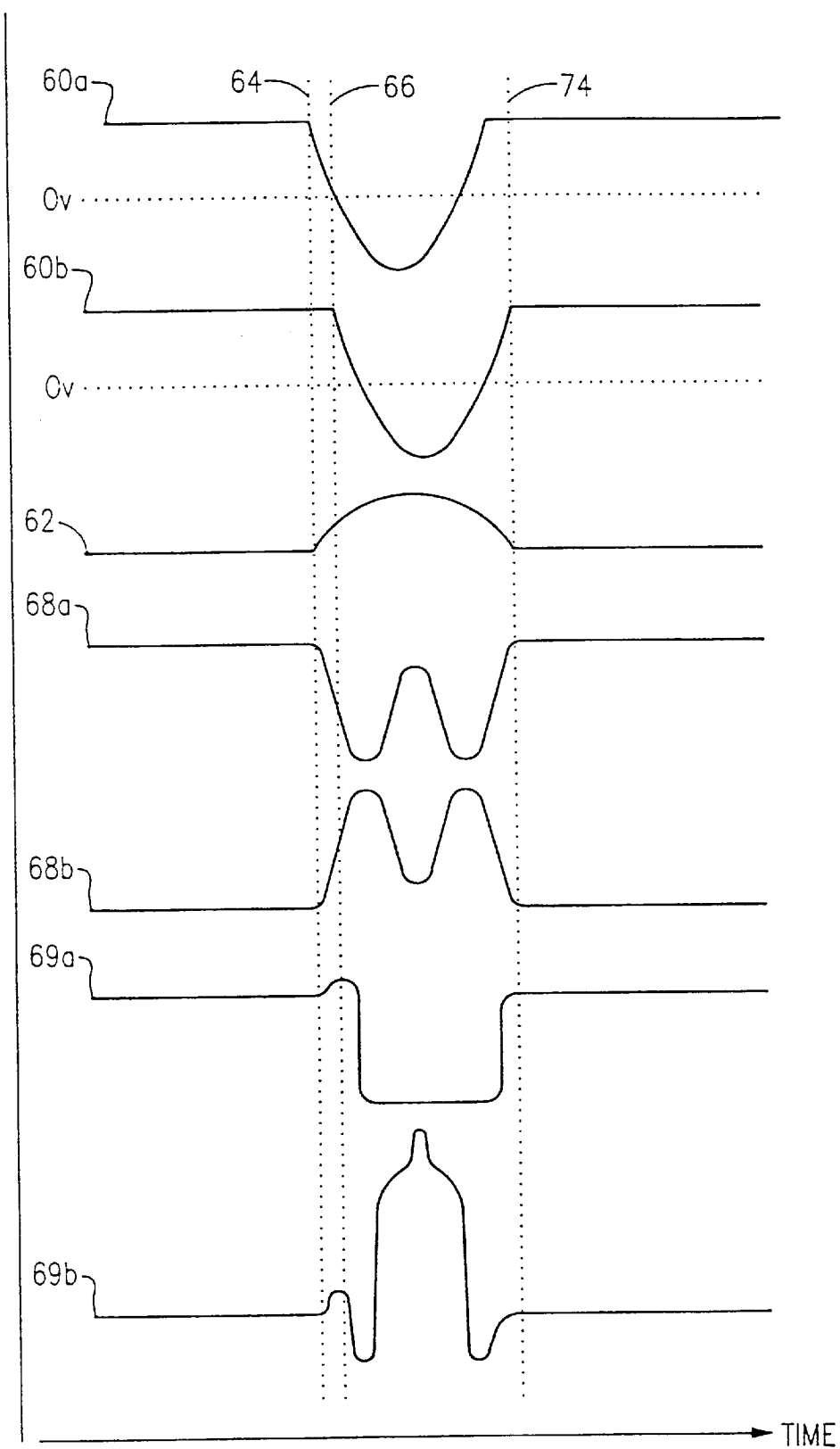

A focus shifting operation will now be described with reference to FIGS. 2, 3, and 4. According to the invention, when it is desired to shift focus of the objective lens from a first information layer F1 of the optical medium to a second information layer F2 in a closed loop mode of servo operation, a phantom focal plane is created by multiplying the two activated control signals on lines 49a, 49b with the output signals on lines 47a, 47b to produce two modified focus error components on lines 43a, 43b. The phantom focal plane is shifted toward the second information layer F2 by independently varying the voltages of the two control signals on lines 49a, 49b in a predefined manner. The two modified focus error components on lines 43a, 43b are compared to each other by a differential amplifier 46 to generate a focus error signal on line 48 that is supplied to the servo circuitry 18. The error signal on line 48 has the effect of attempting to cause the servo circuitry 18 to displace the objective lens to follow the continually shifting phantom focal plane. This interaction thus causes the focal point of the objective lens to shift from the first information layer F1 to the second information layer F2. When the focal point of the objective lens is effectively spaced apart from the first information layer F1, the influence on the focus error signal on line 48 is removed by returning the control signals on lines 49a, 49b to a nominal value of +1. The servo circuitry 18 then continues to maintain focus on the second information layer F2.

During a focus shifting operation the control signal generator 42 develops time varying control signals on lines 49a, 49b that range in voltage levels from –1 to +1, which are explained with reference to FIG. 4. The range of –1 to +1 volts is used for descriptive purposes only, and many actual voltage ranges can be used.

For purpose of this explanation, it is assumed that focus has been acquired on a first information layer, and the magnitudes of the output signals on lines 47a and 47b are equal. The control signals on lines 49a and 49b are represented by waveforms 60a, 60b respectively, and have initial values of +1. Consequently the multiplier outputs on lines 43a, 43b are initially equal, and are also equal to the output signals on lines 47a and 47b respectively. The focus error signal on line 48 is initially at a baseline value of zero. An idealized time plot of the focus error signal on line 48 is shown by waveform 62. The signals on lines 47a and 47b are represented by idealized waveforms 68a and 68b respectively. The signals on lines 43a, 43b are represented by idealized waveforms 69a and 69b respectively.

The focus shifting operation is begun at a time indicated by reference numeral 64. When the control signal generator 42 receives a motion control signal on line 29, and a direction control signal on line 31, indicating that focus is to be shifted to the second information layer F2, the control signal on line 49a begins a sinusoidal transition from a value of +1 to a value of –1 at time 64. When the control signal on line 49a has reached a potential of zero volts at a subsequent time 66, the control signal on line 49b begins a sinusoidal transition in the same manner, so that waveform 60b lags waveform 60a. It will be evident from inspection of the waveforms 60a, 60b that in the interval between times 64 and 74, the control signals on lines 49a and 49b never are simultaneously at zero volts. The outputs of the multiplier circuits 44a, 44b differ during this interval, and the focus error signal on line 48 (waveform 62) begins to rise as a result of differential amplification by the amplifier 46. In practice the focus error signal on line 48 has high frequency components, which are not shown in waveform 62, and is also affected by the outputs on lines 13a, 13b of the optical pickup link 12. Between times 64 and 74 there is a net rise in the waveform 62 from its baseline value. In practice the outputs on lines 13a, 13b depend on the characteristics of the particular optical medium being read.

The objective lens attempts to track the apparent focal plane in response to the focus error signal on line 48 (waveform 62), and becomes defocused with respect to the information layer F1. As the reflectance of an optical medium differs between the information layer F2 and the non-information bearing regions of the medium, the amplified astigmatic outputs on lines 47a, 47b (FIG. 2) of the optical pickup link 12 diverge (waveforms 68a, 68b). The waveforms 69a, 69b, which respectively represent the products of the signals on line 47a, 47b, and the control signals on lines 49a, 49b also diverge.

Treating the interval defined by times 64, 74 as a 360 degree cycle, the phase angular offset between the waveforms 60a, 60b is optimally 90 degrees, which matches the phase offset of the signals on lines 13a, 13b. While the invention can be practiced with a relatively wide range of phase offsets, if the phase angular offset between the waveforms 60a, 60b is reduced too much, the differential amplifier 46 will sense input values that are close to zero, and the system will become unstable. On the other hand, if the phase angular offset is increased too far above the preferred value, the wave form 62 will take on increasingly sinusoidal characteristics, sometimes with zero crossings, and the system will again not operate effectively.

The phase offsets of the signals on lines 49a, 49b (waveforms 60a, 60b) should be adjusted to match the phase offset of the outputs of the optical pickup 12 for optimum performance.

As explained above, during the focus shifting operation the servo circuitry 18 receives an intentionally incorrect representation of the location of the information layer F1, and attempts to compensate by driving the actuator coil 26 such that the objective lens moves in a direction of the second information layer F2. After the control signals on lines 49a, 49b have both returned to values of +1, the servo circuitry 18 continues in closed loop operation to maintain a focus lock on the second information layer F2. The focus error signal on line 48 has returned to its baseline value.

The interval defined by times 64, 74 is selected according to the response of the servo system, and the characteristics of the optomechanical link between the servo circuitry 18 and the optical pickup 12.

Sinusoidal control waveforms are preferred because they are symmetric, smoothly continuous, and therefore avoid abrupt motions of the actuator. However other waveforms that produce a transition from a level of +1 to –1 could be used, for example triangular waves. It is important that during the focus shifting operation the control signals on lines 49a, 49b never are simultaneously zero, in order to avoid a condition wherein the servo circuitry 18 would sense a value of zero, and become unstable.

It is unnecessary to adjust the duration of the sinusoidal control signals on lines 49a, 49b to correspond with the travel time of the optomechanical link 28. In the event the focal point lies between information layers, for example in region 53 FIG. 3 when both control signals on lines 49a, 49b have returned to baseline, the servo circuitry 18 continues moving the objective lens until a higher voltage level of the focus error signal on line 48 is sensed in region 55. The servo circuitry 18 will then continue to focus the focal point of the objective lens on the information layer F2.

Figure 5:
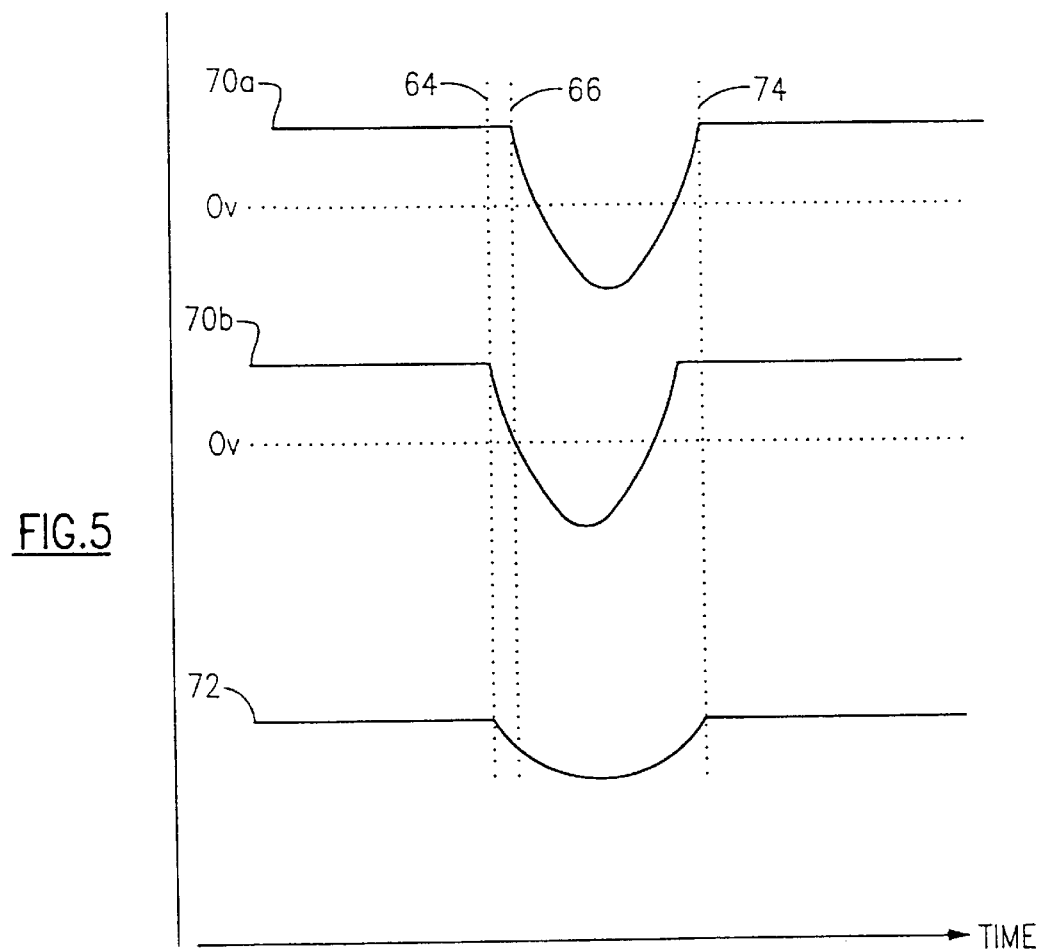
FIGS. 4 and 5 show a plurality of waveforms that occur during a focus shifting operation executed by the focus control circuit shown in FIG. 2.

To shift focus from the first information layer F1 to a third information layer (not shown) which is disposed in the opposite direction from the second information layer F2, it is only necessary that the waveform described by the control signal 49b lead rather than lag the waveform described by the control signal 49a. This is illustrated in FIG. 5, wherein the control signals on lines 49a and 49b are represented by waveforms 70a, 70b respectively, and have initial values of +1. When the focus shifting operation is initiated at time 64, the control signal 49b begins a sinusoidal transition from a value of +1 to a value of −1. The control signal 49a likewise begins a sinusoidal transition at subsequent time 66, so that waveform 70a lags waveform 70b. The focus error signal on line 48 now describes the waveform 72, and is depressed below its baseline value during the interval defined by times 64, 74. The response of the servo circuitry 18 is to drive the actuator coil 26 and thereby move the objective lens in a direction of the third information layer.

It should be noted that throughout the focus shifting operation the position of the phantom focal plane corresponds to a focus error signal that is within the closed loop operating range of the servo circuitry 18.

The above explanation is given with reference to an astigmatic optical pickup 12 as a non-limiting example. The invention can be practiced with other types of optical pickups, so long as the output can be resolved into at least two components, for example a well known knife edge detector, or the concentric ring detector disclosed in Elliott, U.S. Pat. No. 4,152,586.

The control signal generator 42 is any conventional signal generator capable of producing two phased sinusoidal signals or other time-varying signal outputs in a defined range of amplitudes, preferably −1 to +1 volts. Control signal generator 42 could be a digital signal processor, or even an analog device. It is responsive to a direction control signal on line 31 and a motion control signal on line 29 from another control means, for example a microprocessor (not shown), which generates seek commands in accordance with the requirements of an information reading application and the format of a particular optical medium. A seek command is initiated by issuing the motion control signal over line 29. The optical pickup link 28 then operates in a direction specified by the direction control signal on line 31.

In another mode of operation, when it is not desired to shift focus from one information layer to another, the control signals on lines 49a, 49b are held at +1 volts. The outputs of the multiplier circuits 44a, 44b on lines 43a, 43b are the same as the signals on lines 47a, 47b, and the circuit functions in the same manner as the circuit illustrated in FIG. 1.

As can be appreciated from the foregoing discussion, the invention provides an apparatus for controlling the focal point of a focused beam of light that is directed onto a multilayered optical medium. The apparatus has an optical pickup 12 responsive to light returning from the medium and has first and second outputs 13a, 13b, and a control signal generator 42 for producing first and second control signals 49a, 49b. A first multiplier 44a is coupled to the first output 13a of the optical pickup 12 and the first control signal on line 49a. A second multiplier 44b is coupled to the second output 13b of the optical pickup 12 and the second control signal on line 49b. A circuit is coupled to the output of the first multiplier 44a and the output of the second multiplier 44b and generates a focus error signal on line 48. A focus error servo 18 is responsive to the focus error signal, and an actuator driver, represented as actuator coil 26, is responsive to the servo circuitry 18 for effecting movement of the focal point toward and away from the medium. Preferably the optical pickup 12 is an astigmatic optical pickup, but it can be a knife edge detector, or a concentric ring detector. The first output 13a is optimally in a quadrature relationship with the second output 13b. Preferably the first and second control signals on lines 49a, 49b comprise smoothly continuous waveforms offset from one another by a predetermined phase angle, and optimally are substantially sinusoidal waveforms separated by a phase angle of about 90 degrees.

Figure 6:
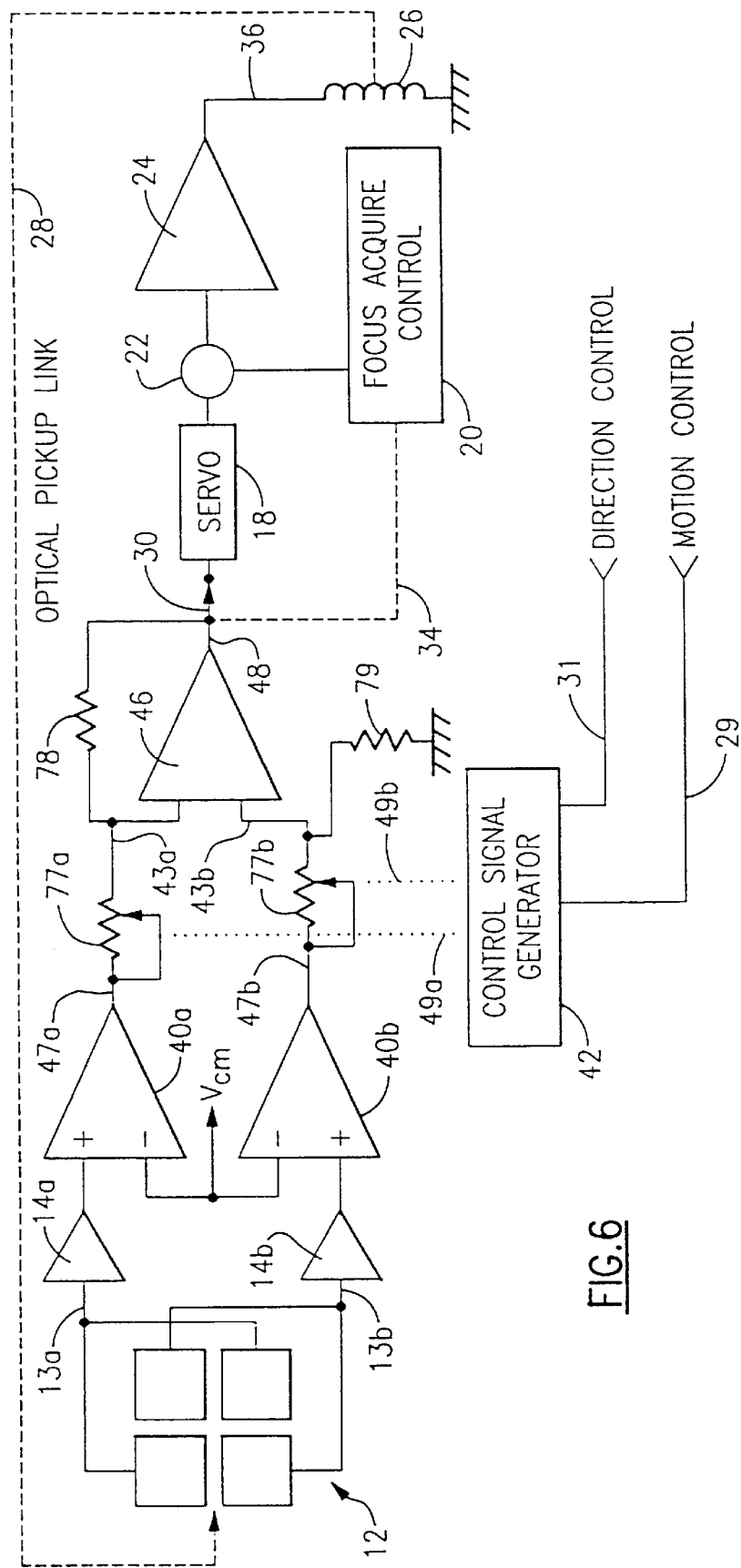
FIG. 6 is a partially schematic block diagram in accordance with a first alternate embodiment of the invention.

A first alternate embodiment of the invention will now be disclosed with reference to FIG. 6, wherein parts identical with those of the previous embodiment are indicated by the same reference numerals. As explained above, it is a feature of the invention that the output of the optical pickup link 12 includes a plurality of components, and that these components are modified in a predetermined manner. In FIG. 6 the multipliers that multiply the output signals on lines 47a, 47b of the operational amplifiers 40a, 40b and the control signals on lines 49a, 49b have been replaced by variable resistance elements 77a, 77b. The control signals on lines 49a, 49b now control the variable resistance elements 77a, 77b to independently modify the output signals on lines 47a, 47b in accordance with a predetermined pattern, preferably the waveforms 60a, 60b (FIG. 4) and 70a, 70b (FIG. 5). A resistor 78 has been placed across the amplifier 46, such that the signal on line 43a connected to one input of the amplifier 46 represents the output of a voltage divider comprising variable resistor 77a and resistor 78. Similarly a resistor 79 connects the other input of the amplifier 46 and ground, so that the signal on line 43b represents the output of a voltage divider comprising variable resistor 77b and resistor 79. In other respects this embodiment is identical to the previous embodiment.

The invention provides a method of manufacturing an apparatus for controlling a beam of radiant energy that is directed onto a optical medium which has a plurality of focal planes and an optical characteristic that varies according to an offset from the focal planes. A source is provided for emitting a focused beam of radiant energy. The beam has a focal point on the medium and returns therefrom. A sensor responsive to the returning beam is provided, wherein the sensor has an output responsive to a focus offset from a first focal plane of the medium. The output of the sensor is resolved into a plurality of components, preferably in quadrature. A first control means is provided for modifying a first component of the output of the sensor, and a second control means for modifying a second component of the output of the sensor is provided. A servo is coupled to the first control means and the second control means, wherein the servo operates in a closed loop mode. An optomechanical link is coupled to the servo for varying the focal point. In operation the first control means and second control means are operative, and the focal point moves from a first focal plane of the medium toward a second focal plane of the medium and the servo locks focus on the second focal plane.

Figure 7:
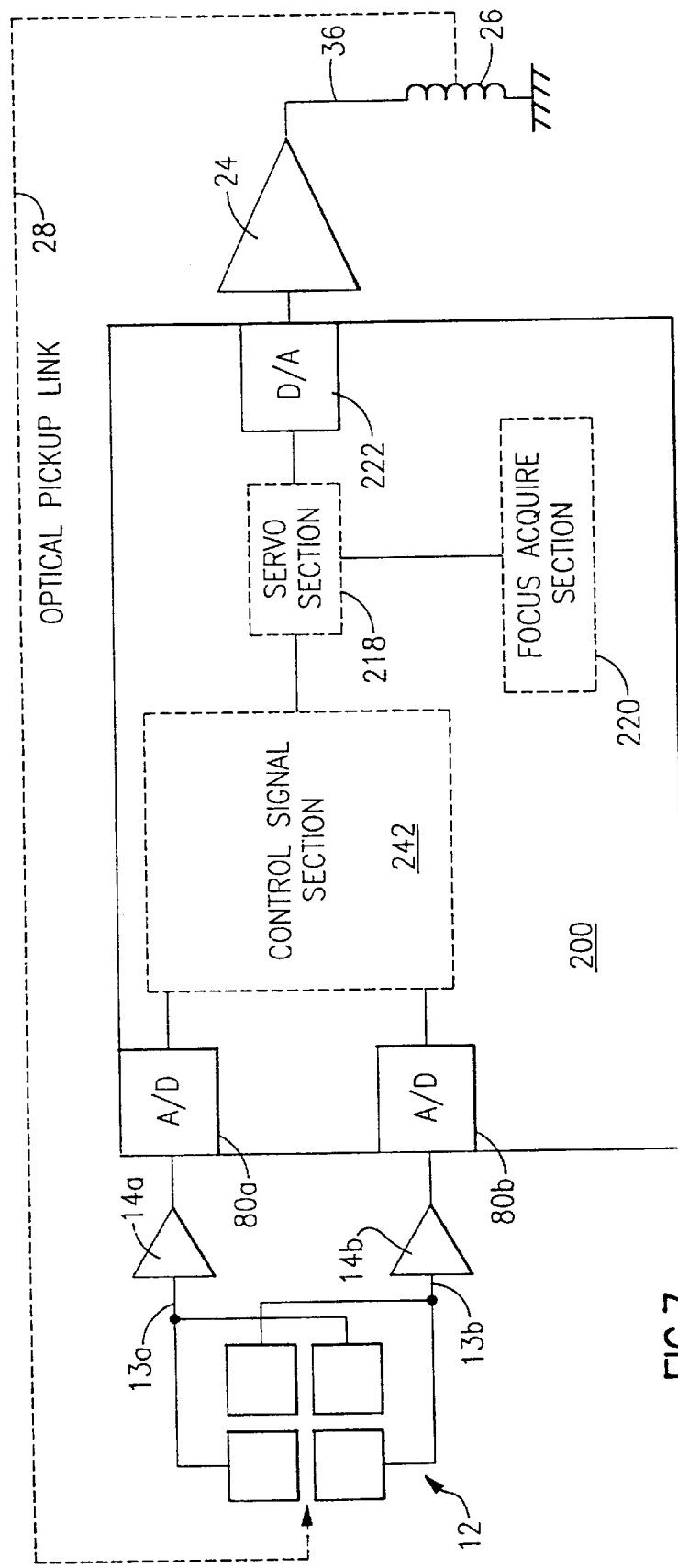
FIG. 7 is a partially schematic block diagram in accordance with a second alternate embodiment of the invention.

A second alternate embodiment of the invention is shown in FIG. 7., wherein parts identical with those of the previous embodiment are indicated by the same reference numerals. In this embodiment, the control signal generator, multipliers, electronics for producing a focus error signal, focus acquisition circuitry, and the servo circuitry are all realized as a digital signal processor 200. The digital signal processor 200 includes a control signal section 242, a focus acquire section 220, and a servo section 218. Operational amplifiers 14*a*, 14*b* are coupled to analog-to-digital converters 80*a*, 80*b* respectively, and the signals output by the analog-to-digital converters are independently modified in the control signal section 242, using a predetermined pattern as in the previous embodiment. An error signal is delivered by the control signal section 242 to the servo section 218. The output of the servo section 218 is reconverted to an analog signal and suitably conditioned in a digital-to-analog conversion section 222. The output of the digital signal processor 200 is amplified in drive amplifier 24 and then handled as described in the first embodiment. The focus acquire section cooperates with the servo section 218 in initially acquiring focus on an information layer of the optical medium being read.

The invention can also be practiced in applications where the sensor measures optical characteristics other than beam intensity, so long as the sensor produces an output having two components, preferably in quadrature relationship. For example it can be utilized in arrangements which the sensor detects diffraction patterns produced by an information layer of a multilayered medium, or which use interferometry to direct an interrogating beam. In such arrangements more than one beam may be directed onto the medium. In general the invention provides a method of controlling a beam of radiant energy that is directed onto a medium having a plurality of information regions, and the medium has a characteristic that varies according to an offset from the information regions. A beam of radiant energy is directed onto the medium and interacts with the medium. Energy resulting from the interaction between the medium and the beam is sensed, and the sensed energy is representative of the characteristic. First and second signals responsive to the sensed energy are generated, preferably in quadrature, and are modified in a predetermined manner. A servo is coupled to the modified first signal and to the modified second signal, wherein the servo operates in closed loop mode. The servo is linked to a beam adjusting means, with which it cooperates to vary an optimization of the beam with respect to a first information region of the medium toward an optimization thereof with respect to a second information region of the medium. The first signal may be generated independently of the second signal, and preferably have smoothly continuous waveforms offset from one another by a predetermined phase angle, optimally about 90 degrees. The smoothly continuous waveforms are preferably substantially sinusoidal.

The embodiments disclosed herein utilize light beams by way of example; however the application of the invention is not limited to light. The invention can be practiced in applications employing other radiant energies that interact with a multi-segmented medium, in which the radiant energies are required to be adjusted to optimally interact with different regions of the medium using a servo feedback loop. Such energies include, but are not limited to radiation in the infrared, ultraviolet, or microwave spectra.

For example chrominance variation can be measured in multicolored optical media in which color varies with an offset from the information layers.

The invention may equally be practiced in applications wherein the light beam that is incident on the sensor is transmitted through the media, rather than back-scattered or reflected.

The radiation reaching the sensor need not be the same radiation as was directed to the medium. For example in a particular application, the energy received by the sensor could be a secondary emission from materials in the optical media, or in the information layer thereof, that are excited by a primary beam and possess photochemical properties. It is only necessary that the primary beam interact with a medium to produce a signal that reaches the sensor, and that the sensor produce an output having more than one component, such as two outputs in quadrature.

While this invention has been explained with reference to the structure disclosed herein, it is not confined to the details set forth and this application is intended to cover any modifications and changes as may come within the scope of the following claims:

What is claimed is:

1. An apparatus for controlling a focal point of a focused beam of light that is directed onto a focal plane lying within an optical medium having a first and second information layers, comprising:

an optical pickup responsive to light returning from said focal point, said optical pickup having first and second optical pickup outputs;

a control signal generator for producing a first control signal and a second control signal, said control signal generator implemented to move said focal plane from said first information layer to said second information layer;

a first multiplier coupled to said first optical pickup output and said first control signal, said first multiplier having a first multiplier output;

a second multiplier coupled to said second optical pickup output and said second control signal, said second multiplier having a second multiplier output;

a circuit for combining said first multiplier output and said second multiplier output to generate a focus error signal representative of the location of said focal point with respect to said focal plane;

a focus error servo responsive to said focus error signal; and an actuator driver responsive to said focus error servo for effecting movement of said focal point with said focal plane.

2. The apparatus according to claim 1, wherein said first optical pickup output is in a quadrature relationship with said second optical pickup output.

3. The apparatus according to claim 1, wherein said first and second multipliers comprise analog multipliers.

4. The apparatus according to claim 1, wherein said first and second control signals comprise smoothly continuous waveforms offset from one another by a predetermined phase angle.

5. The apparatus according to claim 4, wherein said smoothly continuous waveforms are substantially sinusoidal.

6. The apparatus according to claim 4, wherein said phase angle is about 90 degrees.

7. The apparatus according to claim 1, wherein said control signal generator, said first multiplier, said second multiplier, said circuit, and said focus error servo are incorporated in a digital signal processor.

8. A method for controlling a focal point of a focused beam of light that is directed onto a focal plane lying within an optical medium having a first and second information layers, comprising:

detecting light returning from said focal point;

generating a first output signal and a second output signal in response to said detected light;

generating a first control signal and a second control signal adapted to move said focal plane from said first information layer to said second information layer;

multiplying said first output signal and said first control signal to produce a first multiplied signal;

multiplying said second output signal and said second control signal to produce a second multiplied signal;

combining said first multiplied signal and said second multiplied signal to generate a focus error signal representative of the location of said focal point with respect to said focal plane;

coupling a servo to said focus error signal; and linking said servo to a beam adjusting means, whereby said beam adjusting means effects movement of said focal point with said focal plane.

9. The method according to claim 8, wherein said first output signal is in a quadrature relationship with said second output signal.

10. The method according to claim 8, wherein said first output signal is generated independently of said second output signal.

11. The method according to claim 8, wherein said first and second control signals have smoothly continuous waveforms offset from one another by a predetermined phase angle.

12. The method according to claim 11, wherein said smoothly continuous waveforms are substantially sinusoidal.

13. The method according to claim 11, wherein said phase angle is about 90 degrees.

14. The method according to claim 12, wherein said phase angle is about 90 degrees.

15. The apparatus according to claim 1, wherein said control signal generator, said first multiplier, said second multiplier, said circuit, and said focus error servo are incorporated in a digital signal processor.

* * * * *